(12) United States Patent
Spangler

(10) Patent No.: US 10,590,785 B2
(45) Date of Patent: Mar. 17, 2020

(54) BEVELED COVERPLATE

(71) Applicant: United Technologies Corporation, Hartford, CT (US)

(72) Inventor: Brandon W. Spangler, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 838 days.

(21) Appl. No.: 14/823,394

(22) Filed: Aug. 11, 2015

(65) Prior Publication Data

US 2016/0069190 A1 Mar. 10, 2016

Related U.S. Application Data

(60) Provisional application No. 62/048,079, filed on Sep. 9, 2014.

(51) Int. Cl.
*F01D 9/06* (2006.01)

(52) U.S. Cl.
CPC .......... *F01D 9/065* (2013.01); *F05D 2240/11* (2013.01); *F05D 2240/81* (2013.01); *F05D 2250/232* (2013.01); *F05D 2260/201* (2013.01); *Y02T 50/672* (2013.01); *Y02T 50/676* (2013.01)

(58) Field of Classification Search
CPC ...... F01D 9/065; F01D 25/12; F05D 2241/11; F05D 2240/80; F05D 2240/81; F05D 2250/192; F05D 2260/201; Y02T 50/672; Y02T 50/676; F23R 2900/03044
See application file for complete search history.

(56) References Cited

U.S. PATENT DOCUMENTS

| | | | | | |
|---|---|---|---|---|---|
| 4,642,024 | A | * | 2/1987 | Weidner | F01D 11/08 415/116 |
| 5,165,847 | A | * | 11/1992 | Proctor | F01D 11/08 415/115 |
| 6,146,091 | A | * | 11/2000 | Watanabe | F01D 9/04 415/111 |
| 6,868,676 | B1 | * | 3/2005 | Haynes | F02C 3/14 60/740 |
| 7,721,292 | B2 | * | 5/2010 | Frasier | G06F 9/505 709/226 |
| 8,348,602 | B2 | * | 1/2013 | Botrel | F01D 11/24 415/173.1 |
| 9,011,079 | B2 | * | 4/2015 | Coign | F01D 5/188 415/115 |
| 9,845,691 | B2 | * | 12/2017 | Allen | F01D 25/00 |
| 2009/0047122 | A1 | * | 2/2009 | Medynski | F01D 9/04 415/173.1 |
| 2011/0229305 | A1 | * | 9/2011 | Bergman | F01D 9/041 415/115 |
| 2012/0128497 | A1 | * | 5/2012 | Rowley | F01D 9/041 416/185 |

(Continued)

*Primary Examiner* — Jason H Duger
(74) *Attorney, Agent, or Firm* — Snell & Wilmer LLP

(57) ABSTRACT

A gas turbine engine includes a platform that has a gas path side, a non-gas path side, a first mate face, and a second mate face. The second mate face has a beveled edge sloping towards the first mate face. The gas turbine engine also includes a coverplate that includes a first bend, a flat portion substantially parallel to the first mate face and a first wing substantially parallel to the second mate face.

16 Claims, 6 Drawing Sheets

(56) References Cited

U.S. PATENT DOCUMENTS

| | | | |
|---|---|---|---|
| 2013/0031914 A1* | 2/2013 | Lee | F01D 5/186 |
| | | | 60/806 |
| 2013/0051979 A1* | 2/2013 | Durocher | F01D 9/04 |
| | | | 415/115 |
| 2014/0353289 A1* | 12/2014 | Luketic | B23K 9/0026 |
| | | | 219/75 |
| 2016/0069570 A1* | 3/2016 | Twardochleb | F23R 3/10 |
| | | | 60/796 |
| 2017/0211479 A1* | 7/2017 | Little | F01D 9/023 |

\* cited by examiner

BEVELED COVERPLATE

CROSS-REFERENCE TO RELATED APPLICATIONS

This application is a nonprovisional of, and claims priority to, and the benefit of U.S. Provisional Application No. 62/048,079, entitled "BEVELED COVERPLATE," filed on Sep. 9, 2014, which is hereby incorporated by reference in its entirety.

FIELD

The present disclosure relates generally to a gas turbine engine and more specifically to turbine blades and/or vanes exposed to high temperature.

BACKGROUND

A gas turbine engine may include a turbine section with multiple rows or stages of stator vanes and rotor blades that interact or react with a high temperature gas flow to create mechanical power. In a gas turbine engine, the turbine rotor blades drive the compressor and an electric generator to generate electrical power. The compressor can also include multiple rows or stages of stator vanes and rotor blades that compress air. The efficiency of the engine can be increased by passing a higher temperature gas flow through the turbine or by increasing the pressure ratio provided by the compressor.

However, the turbine inlet temperature is limited to the vane and blade (airfoils) material properties and the cooling capabilities of these airfoils. The first stage airfoils are exposed to the highest temperature gas flow since these airfoils are located immediately downstream from the combustor. The temperature of the gas flow passing through the turbine progressively decreases as the rotor blade stages extract energy from the gas flow.

Also, the pressure ratio is limited to the airfoil material properties and the cooling capabilities of these airfoils in the compressor. The increase in pressure and proximity to the combustor in later compressor stages causes the temperature within the combustor, and in particular on the airfoil surfaces, to increase.

SUMMARY

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

A gas turbine engine component is described. The gas turbine engine includes a platform that has a gas path side, a non-gas path side, a first mate face, and a second mate face. The second mate face has a beveled edge sloping towards the first mate face. The gas turbine engine also includes a coverplate that includes a first bend, a flat portion substantially parallel to the first mate face and a first wing substantially parallel to the second mate face.

In various embodiments, the platform is an outer diameter platform. In various embodiments, the platform is an inner diameter platform. In various embodiments, the coverplate defines an impingement cooling hole. In various embodiments, the platform and the coverplate define a cavity. In various embodiments, the cavity includes an opening for at least one of channel flow cooling and axial flow cooling. In various embodiments, the first bend is between 10 degrees and 45 degrees. In various embodiments, the first bend is between 20 degrees and 30 degrees. In various embodiments, the gas turbine engine component also includes a cooling hole defined by the first wing. In various embodiments, the gas turbine engine component also includes a third mate face on the non-gas path side, the third mate face having a beveled edge partially facing the beveled edge of the second mate face, and the coverplate has a second bend and a second wing that partially faces the first wing with the second wing substantially parallel to the third mate face. In various embodiments, the second bend is bent at an angle and the first bend is bent at substantially a transverse of the angle. In various embodiments, the first wing defines a first cooling hole and the second wing defines a second cooling hole. In various embodiments, the platform and the coverplate define an opening to a core of the gas turbine engine component. In various embodiments, the gas turbine engine component also includes a leading edge and a trailing edge wherein the first bend extends substantially from the leading edge to the trailing edge. In various embodiments, the gas turbine engine component also includes an airfoil positioned on the gas path side of the platform.

Also described is a gas turbine engine assembly. The assembly includes a compressor section, a combustor section and a turbine section. At least one of the compressor section or the turbine section includes a component that includes a platform. The platform includes a gas path side, a non-gas path side, and a platform floor on the non-gas path side. The platform also includes a first mate face on the non-gas path side that is offset from the platform floor by a first distance. The platform also includes a second mate face on the non-gas path side that includes a beveled edge sloping towards the platform floor. The second mate face is offset from the platform floor by a second distance that is larger than the first distance. The component also includes a coverplate that includes a first bend, a flat portion substantially parallel to the first mate face of the platform, and a first wing that is substantially parallel to the second mate face of the platform.

In various embodiments, the assembly further includes a duct adapted to channel coolant from the compressor section to the non-gas path side of the platform. In various embodiments, the assembly also includes a cavity defined by the coverplate and the platform, wherein the coverplate defines a cooling hole adapted to allow coolant to flow into the cavity.

Also described is a gas turbine engine component. The component includes a platform having a gas path side, and a non-gas path side. The platform also includes a first mate face, a second mate face having a beveled edge sloping towards the first mate face, and a third mate face adjacent the second mate face on the non-gas path side. The component also includes a coverplate that includes a first bend, a flat portion substantially parallel to the first mate face, and a first wing substantially parallel to the second mate face. The coverplate also includes a second bend and a second wing substantially parallel to the third mate face.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

FIG. 1 is cross-sectional view of an exemplary gas turbine engine in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Figure 1:
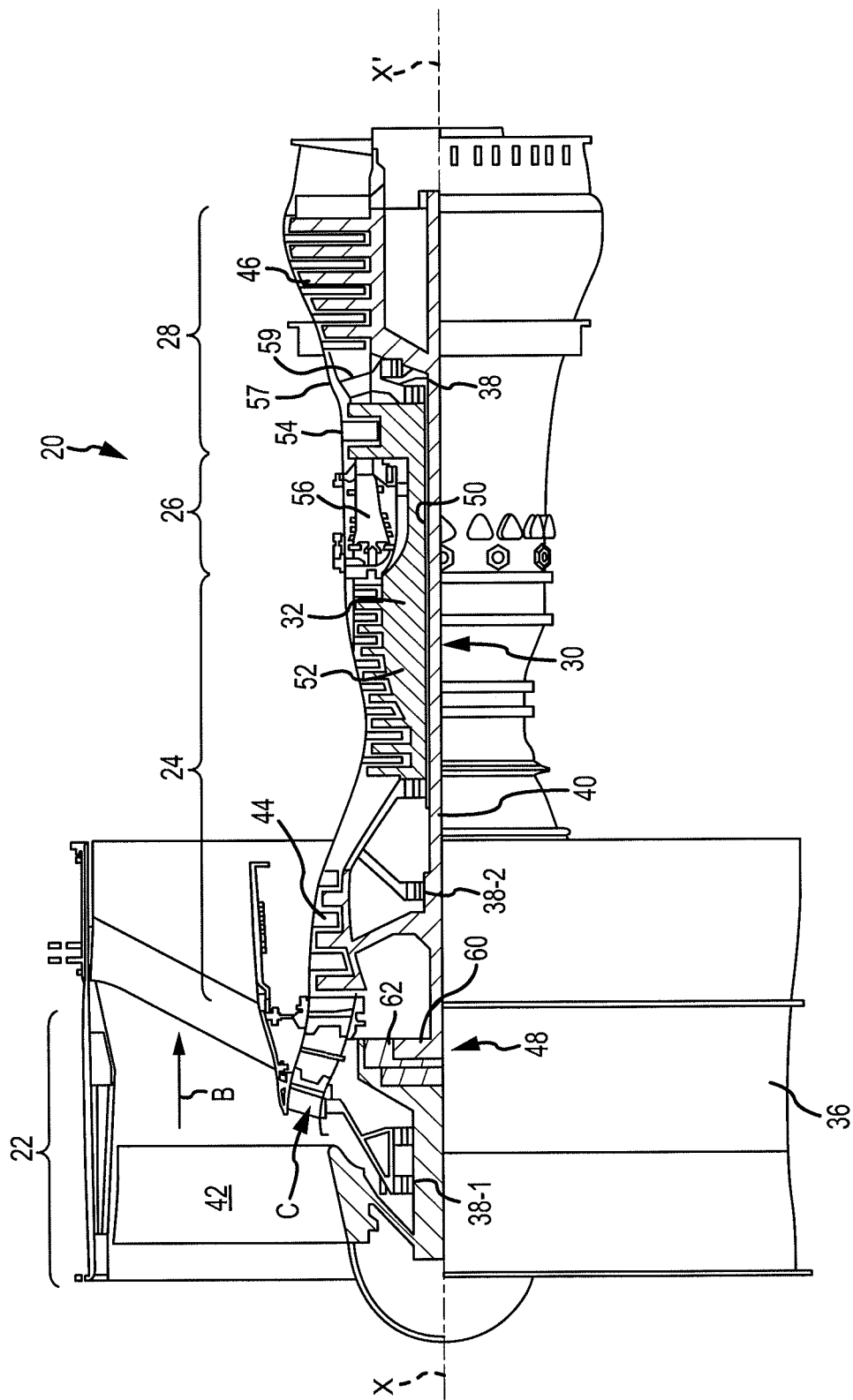

In various embodiments and with reference to FIG. 1, a gas turbine engine 20 is provided. Gas turbine engine 20 may be a two-spool turbofan that generally incorporates a fan section 22, a compressor section 24, a combustor section 26 and a turbine section 28. Alternative engines may include, for example, an augmentor section among other systems or features. In operation, fan section 22 can drive air along a bypass flow-path B while compressor section 24 can drive air along a core flow-path C for compression and communication into combustor section 26 then expansion through turbine section 28. Although depicted as a turbofan gas turbine engine 20 herein, it should be understood that the concepts described herein are not limited to use with turbofans as the teachings may be applied to other types of turbine engines including three-spool architectures.

Gas turbine engine 20 may generally comprise a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, bearing system 38, bearing system 38-1, and bearing system 38-2.

Low speed spool 30 may generally comprise an inner shaft 40 that interconnects a fan 42, a low pressure (or first) compressor section 44 and a low pressure (or first) turbine section 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 couples inner shaft 40 to a rotating fan structure. High speed spool 32 may comprise an outer shaft 50 that interconnects a high pressure (or second) compressor section 52 and high pressure (or second) turbine section 54. A combustor 56 may be located between high pressure compressor 52 and high pressure turbine 54. A mid-turbine frame 57 of engine static structure 36 may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C may be compressed by low pressure compressor section 44 then high pressure compressor 52, mixed and burned with fuel in combustor 56, then expanded over high pressure turbine 54 and low pressure turbine 46. Mid-turbine frame 57 includes airfoils 59 which are in the core airflow path. Turbines 46, 54 rotationally drive the respective low speed spool 30 and high speed spool 32 in response to the expansion.

Gas turbine engine 20 may be, for example, a high-bypass geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Gear architecture 48 may have a gear reduction ratio of greater than about 2.3 and low pressure turbine 46 may have a pressure ratio that is greater than about 5. In various embodiments, the bypass ratio of gas turbine engine 20 is greater than about ten (10:1). In various embodiments, the diameter of fan 42 may be significantly larger than that of the low pressure compressor section 44, and the low pressure turbine 46 may have a pressure ratio that is greater than about 5:1. Low pressure turbine 46 pressure ratio may be measured prior to inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other turbine engines including direct drive turbofans.

Figure 2:
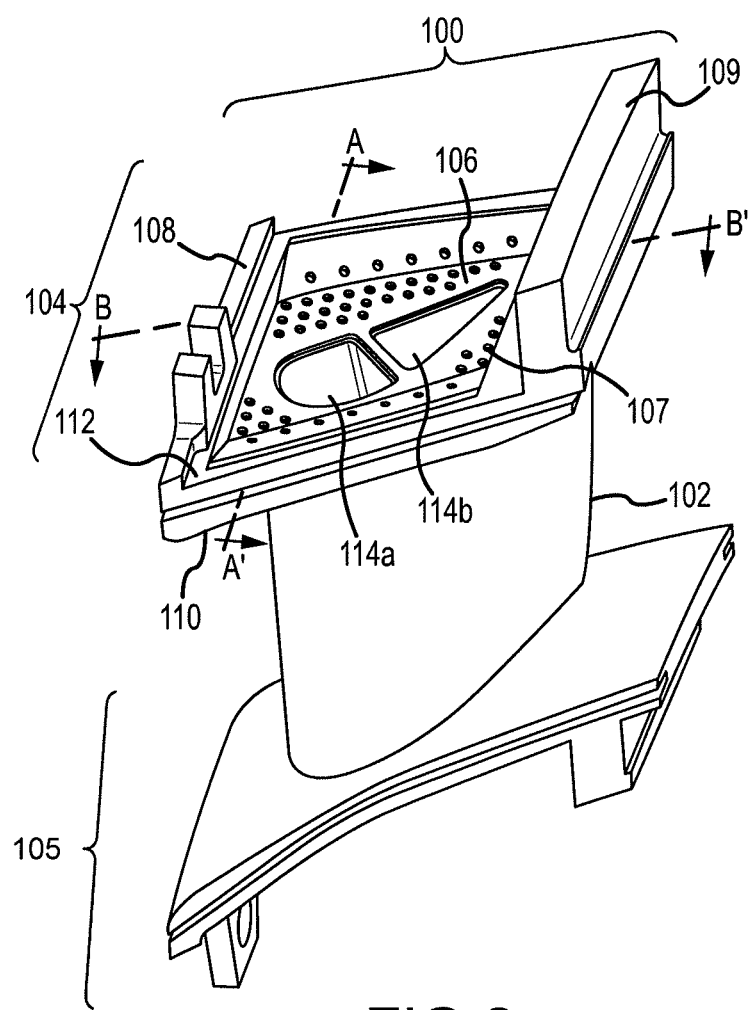
FIG. 2 illustrates a gas turbine engine component in accordance with various embodiments.

FIG. 2 illustrates a gas turbine engine component (component) 100. Component 100 may be, for example, a blade or a vane in compressor 24 or turbine section 28. It will be recognized by one skilled in the art that the concepts described herein may be applied to engine components other than a blade or a vane, such as a blade outer air seal (BOAS), a combustor panel, etc. Component 100 includes an airfoil 102, a platform 104, a platform 105 and a coverplate 106. Component 100 may rotate about an axis of rotation (axis X-X' illustrated in FIG. 1). A radially outward direction from the axis of rotation would extend from platform 105 through airfoil 102 and then through platform 104. A radially inward direction from the axis of rotation would extend from platform 104 through airfoil 102 and to platform 105.

Figure 3:
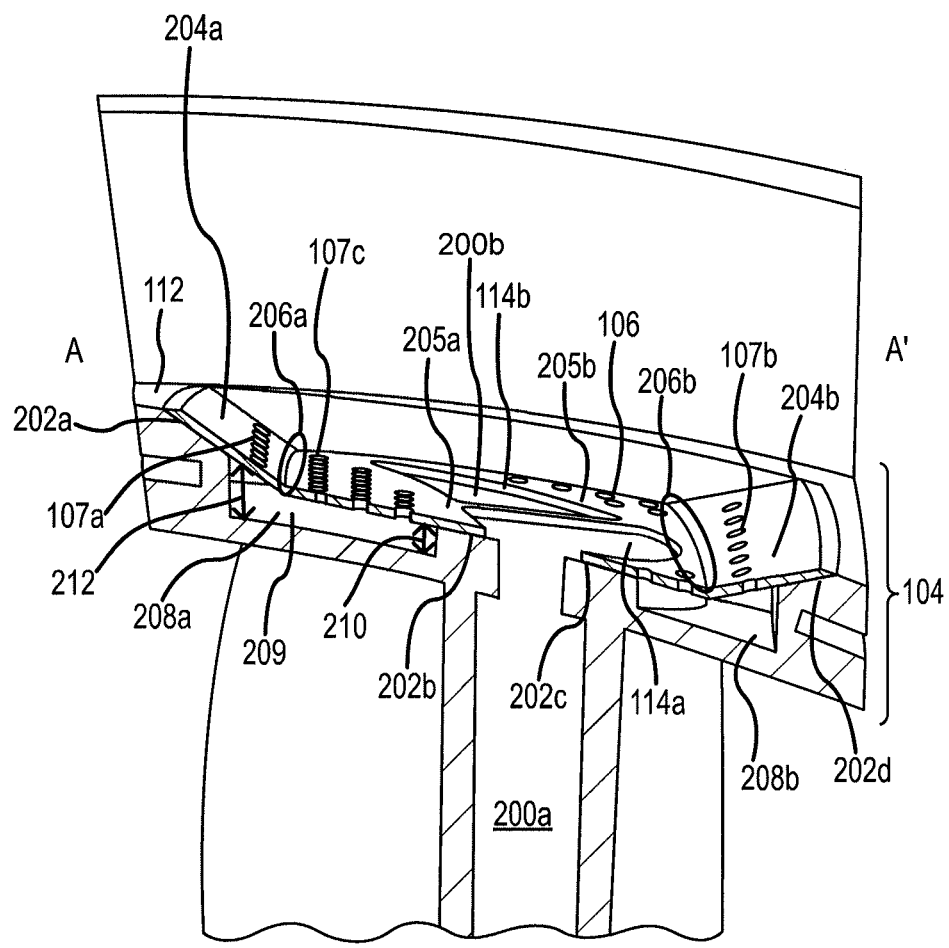
FIG. 3 illustrates a cross section of a component including a beveled coverplate in accordance with various embodiments.

As illustrated, platform 104 is an outer diameter platform and platform 105 is an inner diameter platform. Aspects discussed herein can apply to an inner diameter platform as well as an outer diameter platform. Platform 104 includes a leading edge rail 108 and a trailing edge rail 109. As shown in FIG. 2, coverplate 106 is attached to platform 104. In various embodiments, coverplate 106 may be formed on platform 104. Platform 104 has a gas path side 110 (can also be referred to as a "heat side") and a non-gas path side 112 (can also be referred to as a "cool side"). Platform 104 and coverplate 106 include openings 114a, 114b to internal cores 200a, 200b (as shown in FIG. 3) of airfoil 102. In various embodiments, any number of openings 114 and internal cores 200 may exist. Coverplate 106 includes cooling holes 107. FIG. 2 illustrates lines A-A' and B-B' for orientation when viewing a cross-section of component 100.

Platform 104 and/or coverplate 106 may be made from, for example, metal, for example, stainless steel, an austenitic nickel-chromium-based alloy such as Inconel® which is available from Special Metals Corporation of New Hartford, N.Y., USA, titanium, composite materials, and other suitable materials or the like. They may be manufactured using a process drip method, metal laser sintering, casting, an additive manufacturing process, stamping sheet metal and/or the like.

FIG. 3 illustrates a cross section of component 100 along line A-A'. As illustrated, platform 104 has mate faces 202a, 202b, 202c, 202d. In various embodiments, mate face 202b and mate face 202c are one, continuous mate face 202 defining openings 114. A mate face may be defined as a face on which coverplate 106 may be attached. Mate face 202b and mate face 202c face radially outward. In various embodiments, mate face 202b and mate face 202c are adjacent to openings 114. Mate face 202b and mate face 202c may define openings 114.

Mate face 202a and mate face 202d are beveled, sloping radially inward, toward a platform floor 209. In various embodiments, mate face 202b and mate face 202c are proximal to openings 114 and mate face 202a and mate face 202d are distal to openings 114.

Coverplate 106 includes wing 204a, wing 204b, flat portion 205a and flat portion 205b. In various embodiments, flat portion 205a and flat portion 205b are one, continuous flat portion 205 defining openings 114. When coverplate 106 is attached to platform 104, flat portions 205 are parallel to mate faces 202b and 202c.

Wing 204a and wing 204b are beveled, extending radially inward, toward flat portions 205. Wings 204 are beveled at substantially the same angle as mate face 202a and mate face 202d. In various embodiments, flat portions 205 are proximal to openings 114 and wings 204 are distal to openings 114.

Between wing 204a and flat portion 205a, coverplate 106 includes a bend 206a. Also, between wing 204b and flat portion 205b, coverplate 106 includes a bend 206b. In various embodiments, coverplate 106, including wings 204 and flat portions 205, is one continuous piece of material, such as a metal, with bends 206 machined thereon. In various embodiments, bends 206 may be between 10 and 45 degrees. In preferred embodiments, bends 206 may be between 20 degrees and 30 degrees. In various embodiments, bends 206 are at transverse angles to each other.

As each bend 206a, 206b is a simple bend of one piece of material, coverplate 106 is easy to manufacture.

FIG. 3 illustrates coverplate 106 attached to platform 104. In order to attach coverplate 106 to platform 104, wing 204a is aligned with mate face 202a, wing 204b is aligned with mate face 202d, flat portion 205a is aligned with mate face 202b and flat portion 205b is aligned with mate face 202c. Coverplate 106 may then be welded onto mate faces 202. In various embodiments, coverplate 106 may be attached to mate faces 202 via epoxy, rivets, bolts or the like.

To account for manufacturing tolerances, for example, bend 206a and/or bend 206b may be adapted to bend via manual force. Because bends 206 are simple, adjusting bends 206 in order to make wings 204 flush with mate faces 202a, 202d for welding purposes does not cause negative consequences to coverplate 104. This malleability allows wings 204 to be manipulated to lie flush with mate face 202a and mate face 202d, while flat portions 205 are flush with mate face 202b and mate face 202c for welding purposes.

The angle of bends 206 can be selected at least partially based on material properties. Bends 206 are preferably kept at an angle consistent with allowing flush interface between coverplate 106 and mate faces 202, thus minimizing losses to heat transfer caused by escape of cool air through gaps which would otherwise form therebetween.

Cooling holes 107 may be provided in coverplate 106. In various embodiments, cooling holes 107c may be defined through flat portions 205 of coverplate 106, and cooling holes 107a, 107b may be defined through wings 204. In various embodiments, wings 204 may be configured without cooling holes 107a, 107b.

In various embodiments, platform 104 may require most cooling near mate faces 202a, 202d. By utilizing cooling holes 107a, 107b on wings 204, coolant flow can more easily reach these edges of platform 104, thus providing more effective cooling.

Platform 104 includes platform floor 209. Between coverplate 106 and platform floor 209 are cooling cavity 208a and cooling cavity 208b. In various embodiments, cooling cavities 208 may be a single cooling cavity. Cooling cavities 208 may be impingement cooling cavities and/or may be cooling cavities in axial flow or channel flow cooling systems. Cooling cavity 208a has a distance 212 between coverplate 106 and platform floor 209 at the inner edge of mate face 202a and wing 204a (i.e., the edge nearest openings 114). Distance 212 is larger than a distance 210 between coverplate 106 and platform floor 209 at the inner edge of flat portion 205a and mate face 202b (i.e., the edge nearest openings 114). Distances 212 and 210 may have the same corresponding values at the edges of mate face 202d and wing 204b and mate face 202c and flat portion 205b.

Because coverplate 106 is relatively close to platform 104, cooling cavities 208 may have relatively short distances (e.g., distances 210, 212) between coverplate 106 and platform 104. Smaller distances 210, 212 are preferable, because shallower cooling cavities 208 result in better cooling. Angles of bends 206 can be chosen based on balancing of optimal cooling cavity 208 distances 210, 212 and structural properties of coverplate 106.

Cooling hole 107a and cooling hole 107b on wings 204 provide improved cooling of component 100. Vertical walls of platform 104 may be peak heat load areas. By utilizing cooling hole 107a and cooling hole 107b on wing 204a and wing 204b, cool impingement air is directed at vertical walls of platform 104. This increases cooling of the vertical walls as cool air directed at the vertical wall cools more efficiently than air not directly impinging upon the vertical wall. If component 100 is a channel or axial flow design, then the distance 212 will still provide improved cooling efficiency over a coverplate 106 without bends 206.

Embodiments of component 100 utilizing bends 206 on coverplate 106 and/or beveled mate face 202a and mate face 202d can result in a reduced mass of component 100. Reduced mass of component 100 can result in better performance by gas turbine engine 20.

If coverplate 106 were to be flat (i.e., not including bends 206), mate face 202b and mate face 202c would not contact coverplate 106 for welding. In order for contact to exist between a flat coverplate and mate face 202b and 202c, material must be added in order to extend mate face 202b and 202c such that they would reach the flat coverplate. In order to mate to a flat coverplate, mate face 202a and mate face 202d could not be beveled. Mate face 202a and 202d would require additional material to create a flat mating surface for the flat coverplate. However, because of bends 206 in coverplate 106, mate face 202b and mate face 202c can be closer to platform floor 209, thus requiring less material than if coverplate 106 were to be flat. This reduction in material results in a lower total mass for component 100.

Figure 4:
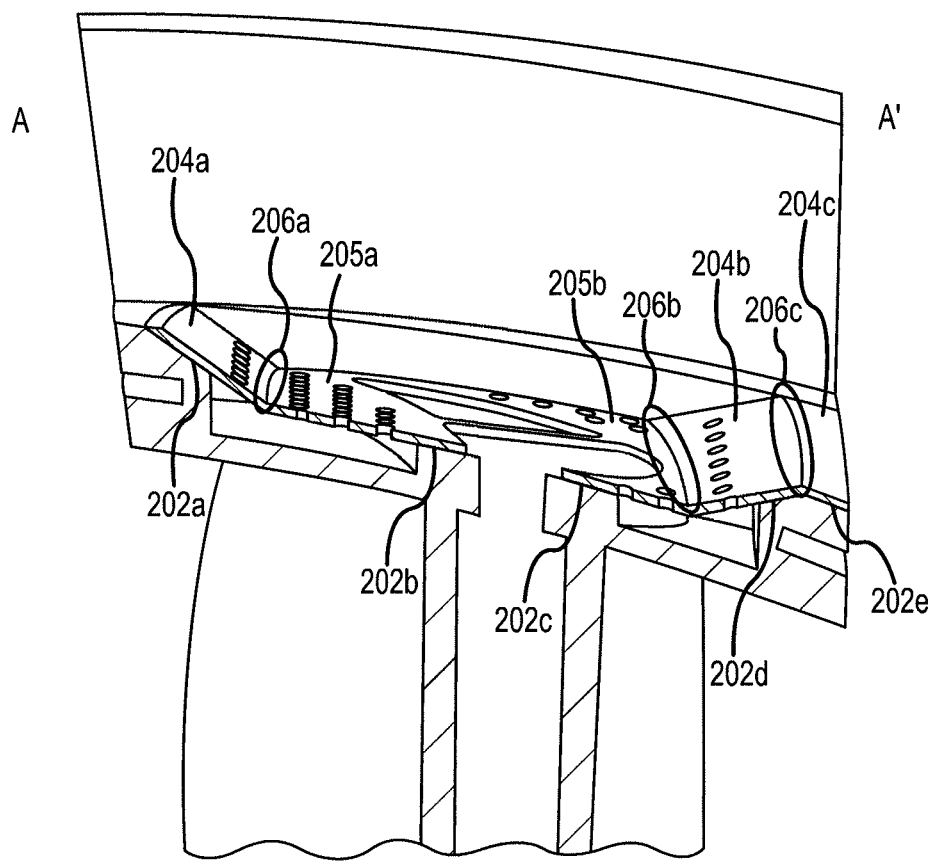
FIG. 4 illustrates a cross section of a component including an alternative beveled coverplate in accordance with various embodiments.

FIG. 4 illustrates a cross section of another embodiment of component 100 along line A-A'. In FIG. 4, a secondary wing 204c exists on coverplate 106. To form secondary wing 204c, another bend 206c may be machined onto coverplate 106. Bend 206c may be the same angle as bend 206b and be bent in the opposite direction from bend 206b. This results in wing 204c being parallel to flat portions 205. In various embodiments, bend 206c may have an angle other than the angle of bend 206b so that it is not parallel to flat portions 205.

In order to accommodate secondary wing 204c, platform 104 may include an additional mate face 202e. In various embodiments, mate face 202e may or may not be parallel to mate face 202b and mate face 202c. This extra mate face 202e may provide additional support for coverplate 106 and another location for coverplate 106 to attach to platform 104. In various embodiments, a secondary wing may exist adjacent to wing 204a (for example, it may be formed by creating another bend at an end of wing 204a that is distal to bend 206a). Another mate face may exist adjacent mate face 202a that is adapted to attach to the secondary wing. In various embodiments only secondary wing 204c and mate face 202e exist, and in various embodiments only a secondary wing adjacent wing 204a and a mate face adjacent mate face 202a may exist. Secondary wing 204c may be welded to mate face 202e. In various embodiments, secondary wing 204c may not be welded to mate face 202e.

Figure 5A:
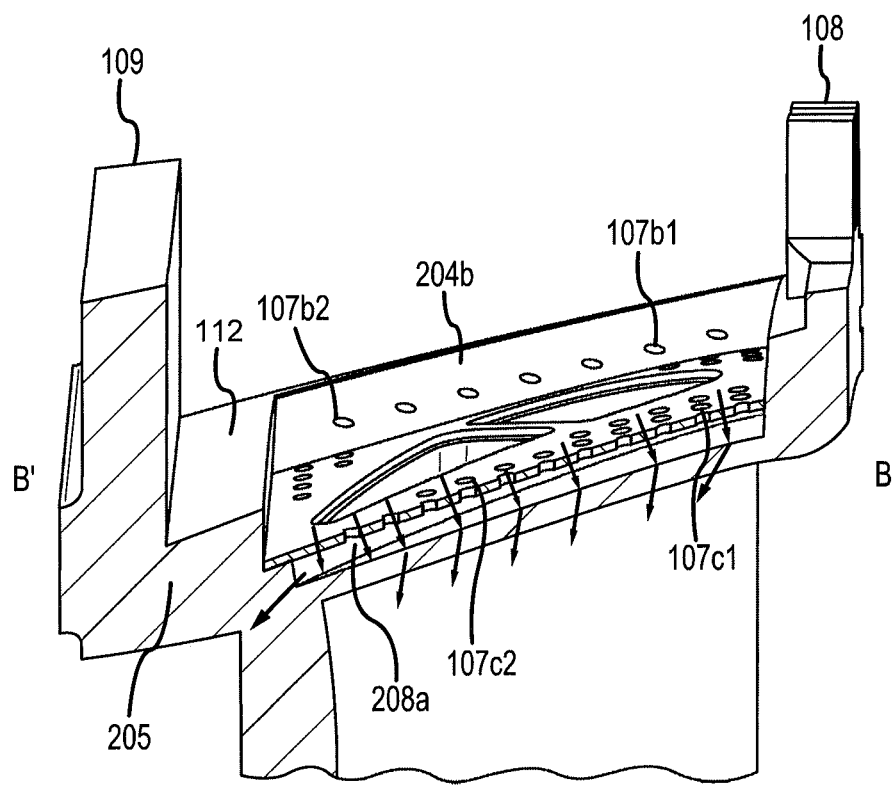
FIG. 5A illustrates a cross section of a component utilizing impingement cooling in accordance with various embodiments.

FIG. 5A illustrates a cross section of component 100 along line B'-B. In the embodiment illustrated in FIG. 5A, cooling holes 107 exist in wing 204b and flat portion 205 of coverplate 106. In particular, cooling holes 107 are distributed throughout the coverplate 106 over cooling cavities 208. This allows for cool air to enter cooling cavity 208a from holes 107b2 and 107c2 near trailing edge rail 109 and from holes 107b1 and 107c1 near leading edge rail 108.

FIG. 5A illustrates an impingement cooling design. In various embodiments, the primary heat transfer mechanism is the impingement of cooling holes 107. Cool air (illustrated by arrows) enters cooling cavity 208 from the non-gas path side 112 through cooling holes 107. Cool air then impinges on platform 104, resulting in heat transfer. The closer to platform 104 cooling holes 107 are, the more heat per unit time is transferred. The air then exits platform 104 via film holes of component 100 (not illustrated).

Figure 5B:
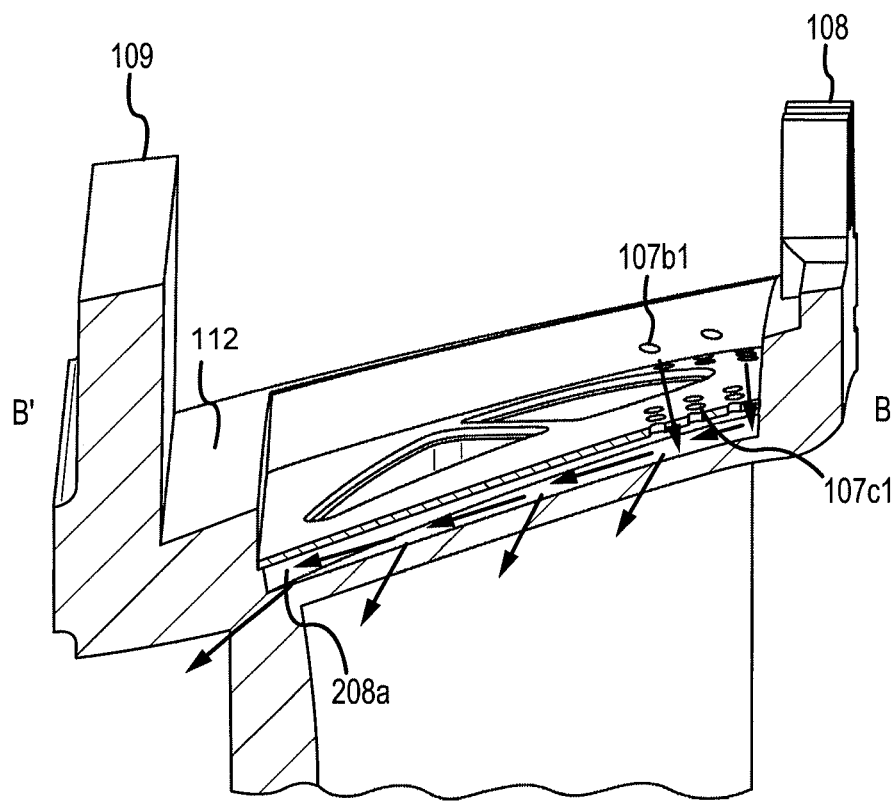
FIG. 5B illustrates a cross section of a component utilizing channel cooling in accordance with various embodiments.

FIG. 5B illustrates a cross section of component 100 along line B'-B. In the embodiment illustrated in FIG. 5B, cooling holes 107 only exist on coverplate 106 near leading edge rail 108. In particular, only holes 107b1 on wing 204b near leading edge rail 108 and holes 107c1 on flat portion 205 near leading edge rail 108 exist.

The embodiment of component 100 illustrated in FIG. 5B illustrates a channel flow cooling design. Cool air (illustrated by arrows) enters cooling cavity 208 from the non-gas path side 112 through cooling holes 107 near leading edge rail 108. In various embodiments, cool air can enter cooling cavity 208 via any other method, such as from a gap between coverplate 106 and platform 104 near leading edge rail 108. Cool air then flows through cooling cavity 208, where the channel flow of cool air is the heat transfer mechanism. The air then exits platform 104 via film holes of component 100 (not illustrated).

Various benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits and advantages, and any elements that may cause any benefit or advantage to occur or become more pronounced are not to be construed as critical, required, or essential features or elements of the disclosure. Reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatuses are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gas turbine engine component comprising:
a platform having a gas path side, a non-gas path side, a platform floor, a first mate face parallel to the platform floor, and a second mate face having a beveled edge sloping towards the first mate face such that the second mate face forms a first angle with the first mate face; and
a coverplate including a first bend of a second angle that is equal to the first angle, a flat portion coupled to the first mate face and parallel to the first mate face, and a first wing coupled to the second mate face and parallel to the second mate face,
wherein the platform and the coverplate define a cavity therebetween, and a first distance between the first wing and the platform floor is greater than a second distance between the flat portion and the platform floor.

2. The gas turbine engine component of claim 1, wherein the platform is an outer diameter platform.

3. The gas turbine engine component of claim 1, wherein the platform is an inner diameter platform.

4. The gas turbine engine component of claim 1, wherein the coverplate defines an impingement cooling hole.

5. The gas turbine engine component of claim 1, wherein the cavity includes an opening for at least one of channel flow cooling and axial flow cooling.

6. The gas turbine engine component of claim 1, wherein the second angle is between 10 degrees and 45 degrees.

7. The gas turbine engine component of claim 6, wherein the second angle is between 20 degrees and 30 degrees.

8. The gas turbine engine component of claim 1, further comprising a cooling hole defined by the first wing.

9. The gas turbine engine component of claim 1, further comprising:
a third mate face on the non-gas path side, the third mate face having a beveled edge partially facing the beveled edge of the second mate face,
wherein the coverplate has a second bend and a second wing that partially faces the first wing with the second wing parallel to the third mate face.

10. The gas turbine engine component of claim 9, wherein the second bend is bent at an angle and the first bend is bent at a transverse of the angle.

11. The gas turbine engine component of claim 9, wherein the first wing defines a first cooling hole and the second wing defines a second cooling hole.

12. The gas turbine engine component of claim 1, wherein the platform and the coverplate define an opening to a core of the gas turbine engine component.

13. The gas turbine engine component of claim 1, further comprising a leading edge and a trailing edge wherein the first bend extends from the leading edge to the trailing edge.

14. The gas turbine engine component of claim 1, further comprising an airfoil positioned on the gas path side of the platform.

15. A gas turbine engine component comprising:
a platform having a gas path side, a non-gas path side, a platform floor, a first mate face parallel to the platform floor, a second mate face having a beveled edge sloping towards the first mate face such that the second mate face forms a first angle with the first mate face, and a third mate face adjacent the second mate face on the non-gas path side; and
a coverplate including a first bend of a second angle that is equal to the first angle, a flat portion coupled to the first mate face and parallel to the first mate face, a first wing coupled to the second mate face and parallel to the second mate face, a second bend, and a second wing parallel to the third mate face,
wherein the platform and the coverplate define a cavity therebetween, and a first distance between the first wing and the platform floor is greater than a second distance between the flat portion and the platform floor.

16. The gas turbine engine component of claim 1, wherein the beveled edge of the platform contacts and is coupled to the first wing of the coverplate.

* * * * *